Jan. 14, 1936.  L. S. WILLIAMS  2,027,504
WEIGHING SCALE
Filed Aug. 16, 1934  4 Sheets-Sheet 1
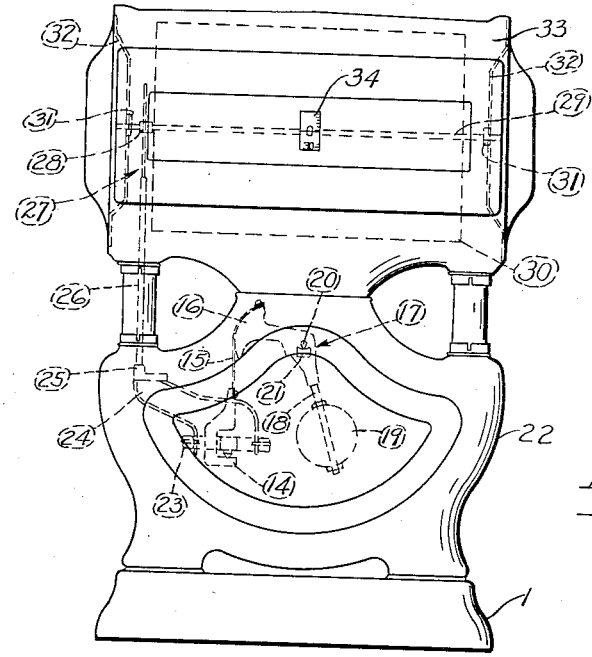
Fig. I
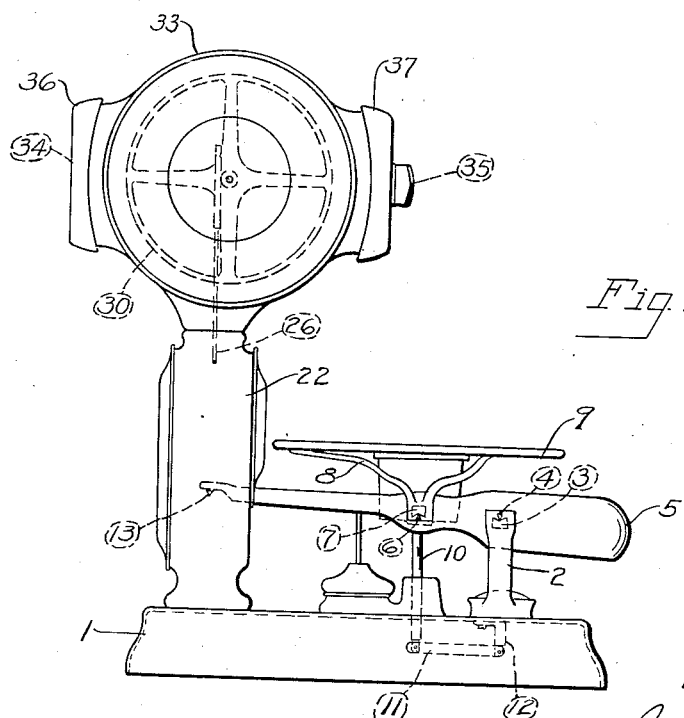
Fig. II
Lawrence S. Williams
INVENTOR
BY  Marshall
ATTORNEY

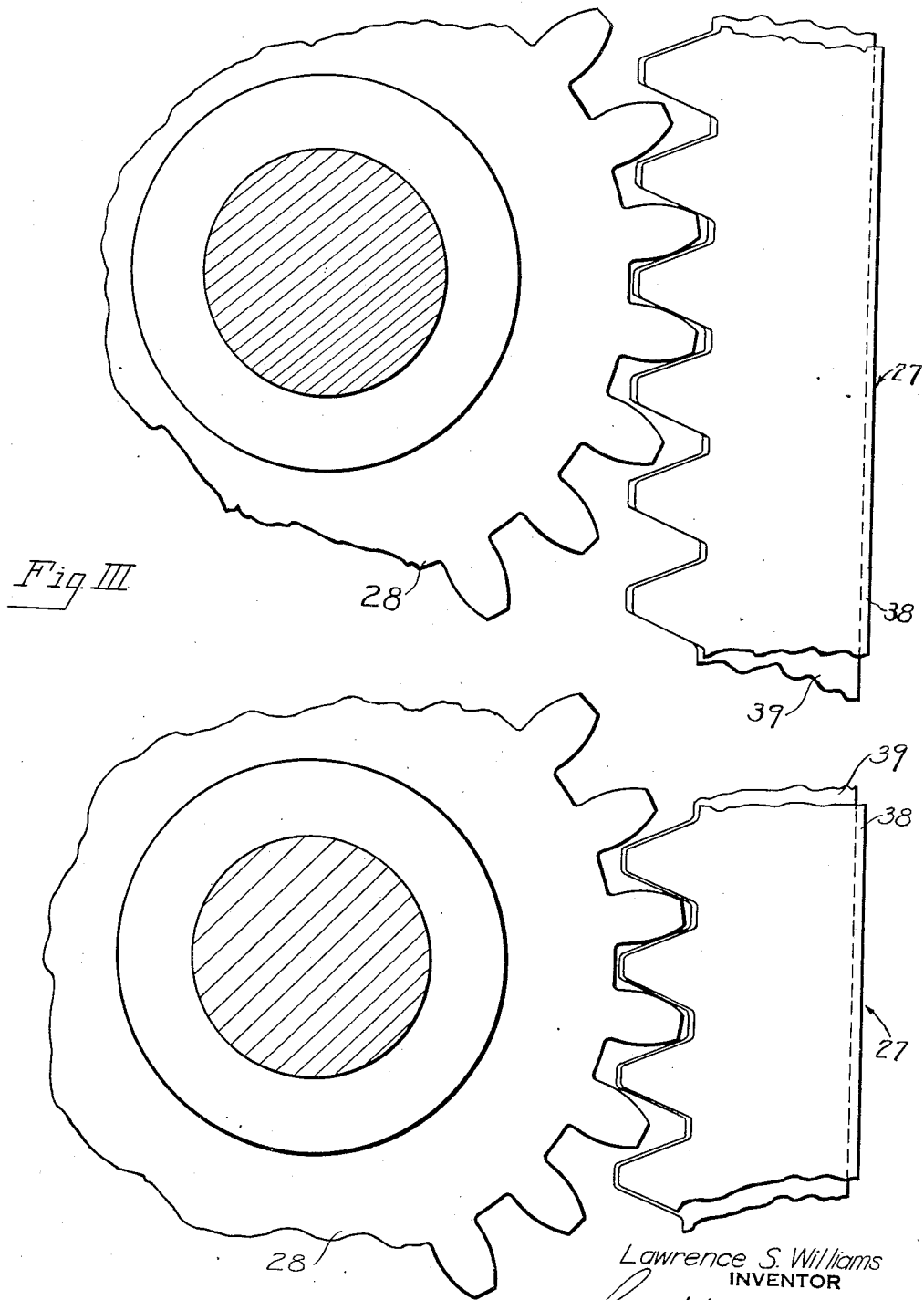

Jan. 14, 1936.    L. S. WILLIAMS    2,027,504
WEIGHING SCALE
Filed Aug. 16, 1934    4 Sheets-Sheet 3
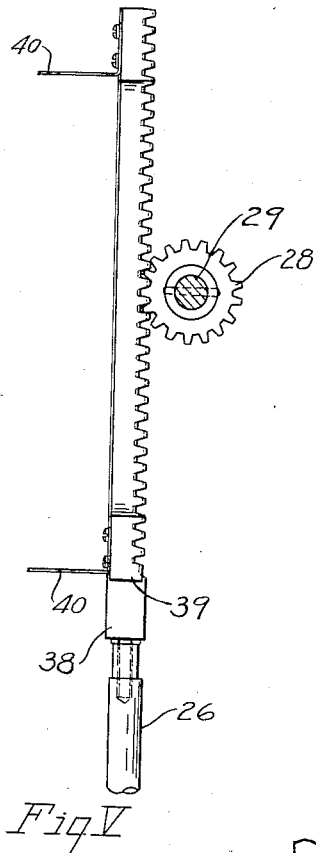
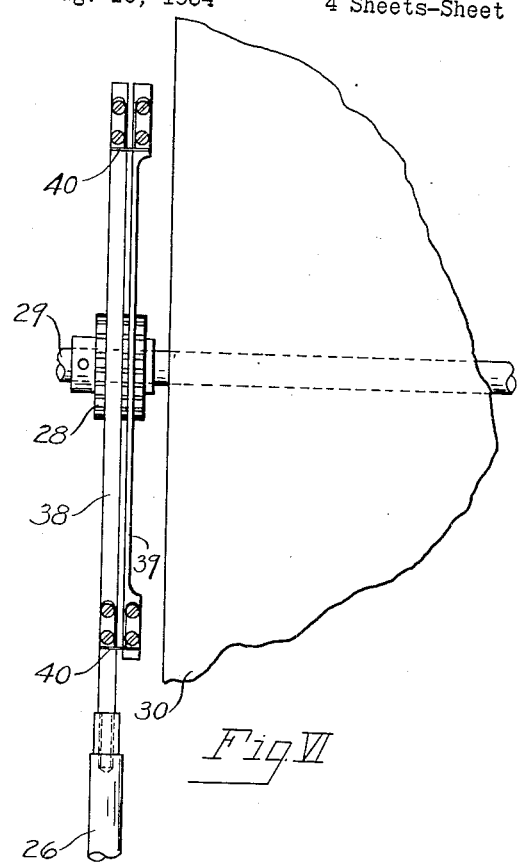
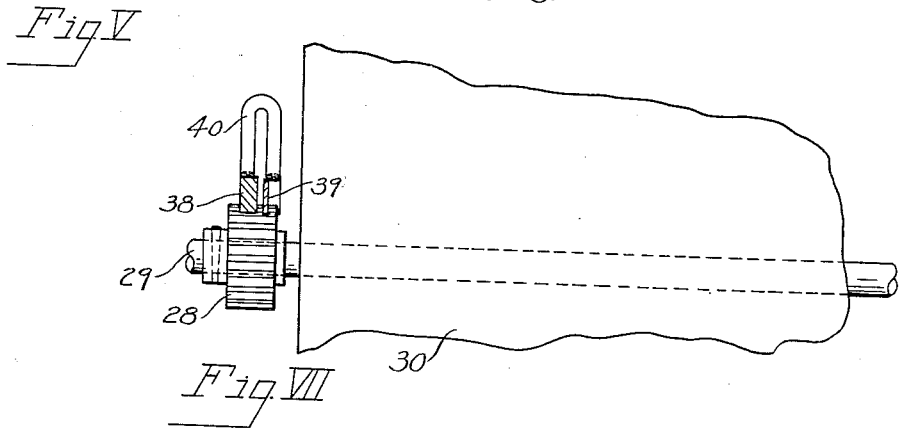
Lawrence S. Williams
INVENTOR
BY *Marshall*
ATTORNEY

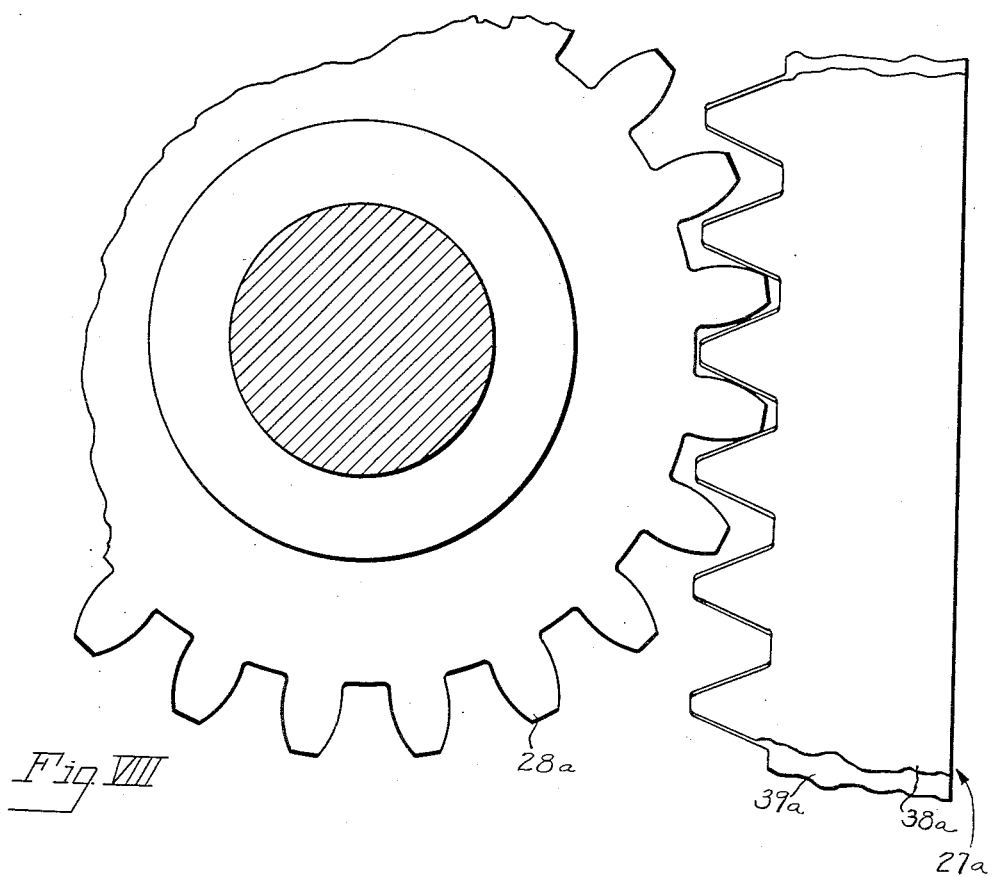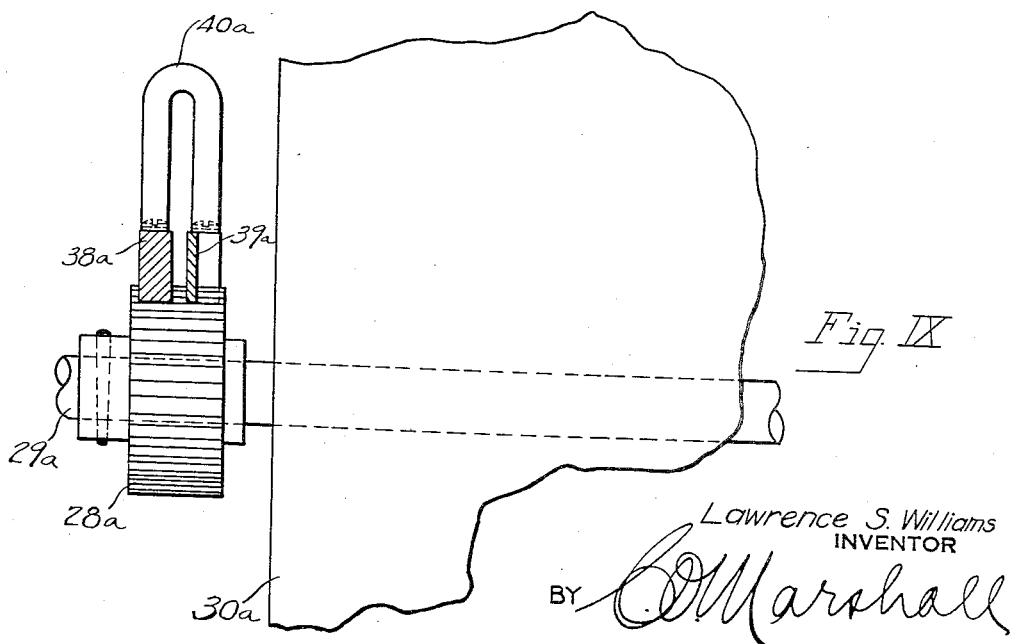

Patented Jan. 14, 1936

2,027,504

UNITED STATES PATENT OFFICE 2,027,504

WEIGHING SCALE

Lawrence S. Williams, Toledo, Ohio, assignor to Toledo Scale Manufacturing Company, Toledo, Ohio, a corporation of New Jersey Application August 16, 1934, Serial No. 740,140

7 Claims. (Cl. 74—422)

This invention relates generally to weighing scales, and more particularly to weighing scales of the so called cylinder type. Scales of this type having a cylindrical chart on which weight and value indicia are printed. Such charts are usually mounted on a horizontally disposed shaft, the ends of which rest in ball or other antifriction bearings and have a pinion seated on the horizontally disposed shaft which is engaged by a rack operatively connected to and actuated by a movable member of the load counterbalancing mechanism to rotate the chart. The pinions and racks employed for this purpose are very accurately cut and delicately balanced. The chart, although designed and constructed as light as possible, has some inertia and therefore careless operation of the scale is apt to injure the teeth of the rack and pinion when the chart is set in motion, such injury might lead to inaccurate weight indications.

The principal object of my invention is the provision of an improved indicator driving means.

Another object is the provision of improved means for obviating indication errors, in a weighing scale, which are caused by injuries to the teeth of racks and pinions.

Another object is the provision of plurality of a scale indicator driving racks.

Still another object is the provision of shock absorbing means in a scale indicator driving member; and, A still further object is the provision of improved means for " centering " the scale indicating means.

These, and other objects and advantages will be apparent from the following description in which reference is had to the accompanying drawings, wherein similar reference numerals designate similar parts throughout the several views.

Referring to the drawings:—

Figure I is a back elevational view of a scale in which I have shown my invention embodied.

Figure II is a side elevational view thereof.

Figure III is an enlarged fragmentary side elevational view of a pinion and rack construction showing their relative position at the instant of initiation of movement, when a load is placed on the scale.

Figure IV is a similar view of the pinion and rack construction when in a state of immobility.

Figure V is an enlarged side elevational view of my improved indicator driving means showing it in engagement with the pinion and the means for flexibly connecting the racks.

Figure VI is a back view thereof showing a fragment of an indicating chart.

Figure VII is a plan view thereof.

Figure VIII is an enlarged fragmentary side elevational view of a modified form of pinion and rack construction; and, Figure IX is a plan view thereof.

Referring to the drawings in detail:—

The scale in which I have shown my improved indicator driving means embodied represents a well known scale of the so called cylinder type comprising a base 1, preferably in the form of a rigid iron casing having base horns 2 mounted thereon, these base horns 2 are provided in their upper ends with bearings 3, upon which fulcrum pivots 4 of a load supporting lever 5 are oscillably mounted. Load pivots 6, extending laterally from the arms of the lever 5, support bearings 7 fixed in downwardly extending arms of a load receiver supporting spider 8 surmounted by a load receiver 9. To insure a condition of level of the load receiver 9 the spider 8 is provided with a depending stem 10 which extends through an opening in the base 1. The lower end of this stem 10 engages one end of a check link 11, the other end of which pivotally engages a depending bracket 12 forming a Roberval parallelogram. The bracket 12, although not shown herein, is usually provided with a universal mounting so that the hereinbefore referred to parallelogram can be accurately adjusted.

In addition to the pivots 4 and 6, fixed in the lever 5, it is provided with a nose pivot 13 in its opposite end, which engages a stirrup 14 suspended from a metallic tape 15, whose upper end overlies an arcuate face of a power sector 16 to which it is fastened. This power sector 16 forms a part of the load counterbalancing pendulum 17 of well known form, which is also provided with a stem 18 on which a pendulum weight 19 is adjustably threaded. A pivot 20, extending through the body of the pendulum 17, oscillably supports it on bearings 21 suitably stationed in hollow housing 22 securely fastened, adjacent one of the ends, to the base 1.

Short laterally extending arms 23 (Figure I) adjacent the nose end of the lever 5, which projects into the interior of the housing 22, pivotally support a rack foot 24 to which a chuck-like retainer 25 is fastened. This retainer 25 adjustably holds an upwardly extending rod 26 to the upper end of which a rack construction 27 is fastened. Teeth forming a part of the rack 27 engage teeth of a pinion 28 pinned on a horizontally extending shaft 29 on which a cylindrical indicating chart 30 is mounted in the usual manner. The ends of the shaft 29 are rotatably mounted in antifriction bearings 31, seated in brackets 32 extending across the open ends of a chart casing 33 which surmounts the housing 22. Weight and value indicia printed on the charts are viewable through openings 34 and 35 in covers 36 and 37 respectively, which are fastened to the front and back of the casing 33.

As hereinbefore mentioned, when a load is carelessly thrown on the receiver 9 of the scale, a shock is transmitted through the medium of the lever 5, the rod 26 and the teeth of the rack construction 27 to the teeth of the pinion 29 in overcoming the inertia of the chart 30. Although this only occurs when the scale is abused by a careless operator, it has been found desirable to provide means for obviating the results of such shocks. I accomplish this by providing two rack members 38 and 39 in my construction.

The member 38, which is considerably thicker than the rack member 39 and fixed in the upper end of the rod 26, receives all of the shock at the initiation of operation of the weighing mechanism. The member 39 is secured to the member 38 by two substantially U shaped flexible clips 40. The teeth of this rack 39 constantly engage the teeth of the pinion 28 while the teeth of the rack 38 are so positioned in relation to the teeth of the pinion 28 that when the weighing mechanism is in a state of immobility they are not in contact. There are several ways of accomplishing this, which give equally desirable results, one is to make the legs of the clip 40 slightly different in length so when the pitch line of the teeth of the rack 39 is in coincidence of the pitch line of the pinion 28, the pitch line of the teeth of the rack 38, although parallel to that of the rack 39, is offset a short distance. A similar result is obtained when the legs of the U shaped clips 40a (Figure IX) are equal in length and the racks 38a and 39a mounted so that their pitch lines are coincident with each other and with the pitch line of the pinion 28a. The clearance between the teeth of the rack 38a and the teeth of the pinion 28a is then obtained by making the teeth of the rack 38a thinner along the pitch line.

When a load is now placed on the load receiver 9 of the weighing mechanism, the nose end of the lever 5 is depressed and the rack rod 26 with the rack construction 27 secured to its upper end moves downwardly. As soon as the movement of the rack is started, the inertia of the chart is sufficient to hold the rack 39 stationary until additional force flexes the clip 40 and permits the teeth of the rack 38 to engage the teeth of the pinion 28 and the broad surface of the teeth of the rack 38 transmit the force to the chart and serve to rotate it through an angle proportional to the weight of the load, and any wear or mutilation resulting from the shock of a careless and rough application of the load it is taken by these teeth and that portion of the pinion 28 engaged by them.

When the weighing mechanism has reached equilibrium, that is, the weight of the load has been counterbalanced by the pendulum mechanism, the tension of the flexible clip is sufficient to return the rack 39 to its proper position in relation to the rack 38, thus centering the chart so that the teeth of the pinion and the teeth of the rack 38 no longer engage each other. Since, due to the flexible mounting of the rack 39, all of the wear takes place between the teeth of the rack 38 and that portion of the teeth of the pinion 28 in contact with it, errors, due to such wear, are obviously eliminated.

It will be readily seen that the embodiments of my invention hereinbefore described are well suited to fulfill the objects primarily stated. However, it is to be understood that the embodiments herein shown are to be regarded illustrative only and that the invention is susceptible to variation, modification and change within the meaning and scope of the subjoined claims.

Having described my invention, I claim:—

1. In a device of the class described, in combination, a rotatable indicator, means adapted to be actuated by force to move said indicator to indicating position and to hold said indicator in indicating position after cessation of such force, said means including a rack, means for moving said rack endwise to various positions, a second rack, resilient means connecting said racks and yieldably holding them against relative longitudinal movement in either direction, and a pinion, connected to said indicator, the teeth of said pinion being in constant mesh with the teeth of said second rack, the teeth of said pinion being engageable with the teeth of the first said rack upon relative longitudinal movement of said racks in either direction.

2. In a device of the class described, in combination, a rotatable indicator, a pinion associated with said indicator, a plurality of racks cooperating with said pinion and teeth of one of said racks engaging teeth of said pinion only when said pinion is moved or restrained by inertia.

3. In a device of the class described, in combination, a plurality of racks, means yieldably holding the axes of the teeth of said racks in substantial alignment, a pinion having teeth in meshing engagement with the teeth of one of said racks and out of contact with the teeth of the other of said racks, said racks being relatively movable against the action of said yieldable holding means to bring the teeth of said other rack into contact with the teeth of said pinion.

4. In a device of the class described, in combination, a rotatable indicator, means for operating said indicator, said operating means including a plurality of racks, the pitch lines of said racks being substantially parallel but offset from each other with reference to a longitudinal base line drawn through one of said racks, yielding means connecting said racks, one of said racks being constantly engaged with said pinion, the other of said racks engaging said pinion under the influence of inertia.

5. In a device of the class described, in combination, a rotatable indicator, means for operating said rotatable indicator, said operating means including a pair of racks mounted in parallel planes and flexible means for connecting one of said racks to the other, said flexible connecting means comprising a substantially U shaped member, one end of said U shaped member being secured to each of said racks.

6. In a device of the class described, in combination, a rotatable indicator, means for operating said rotatable indicator including a pinion mounted on said rotatable indicator and a pair of racks, teeth of one of said racks being in contact with teeth of said pinion, yieldable means for connecting one of said racks to the other and yieldably holding the other of said racks with its teeth out of contact with the teeth of said pinion.

7. In a device of the class described, in combination, a rotatable indicator, a pinion associated with said indicator, a pair of racks cooperating with said pinion, teeth of one of said racks being normal in shape and teeth of the other rack being thinner than the chordal thickness of the teeth of the pinion.

LAWRENCE S. WILLIAMS.